United States Patent
Pawar et al.

(10) Patent No.: US 9,860,766 B1
(45) Date of Patent: Jan. 2, 2018

(54) CONTROL OF VOICE COMMUNICATION CODEC MODE BASED ON NON-VOICE COMMUNICATION

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/016,517

(22) Filed: Feb. 5, 2016

(51) Int. Cl.
*H04W 4/00* (2009.01)
*H04W 24/02* (2009.01)
*G10L 19/00* (2013.01)

(52) U.S. Cl.
CPC ............. *H04W 24/02* (2013.01); *G10L 19/00* (2013.01)

(58) Field of Classification Search
CPC ..... H04L 1/0014; H04L 47/25; H04L 47/263; H04L 47/38; H04W 28/02; H04W 88/181; H04W 24/02
See application file for complete search history.

(56) References Cited

U.S. PATENT DOCUMENTS

| | | | | |
|---|---|---|---|---|
| 8,665,828 | B2* | 3/2014 | Faccin | H04W 60/00 370/331 |
| 9,288,662 | B2* | 3/2016 | Zou | G10L 19/24 |
| 9,729,601 | B2* | 8/2017 | Reddappagari | H04L 65/607 |
| 2008/0212575 | A1 | 9/2008 | Westberg | |
| 2011/0170410 | A1 | 7/2011 | Zhao et al. | |
| 2012/0027006 | A1* | 2/2012 | Snow | H04L 27/2032 370/352 |
| 2014/0269366 | A1* | 9/2014 | Torgersrud | H04L 65/605 370/252 |
| 2015/0092575 | A1* | 4/2015 | Khay-Ibbat | H04L 65/602 370/252 |
| 2016/0269521 | A1* | 9/2016 | Mendiratta | H04L 41/18 |

OTHER PUBLICATIONS

Philippa Warr, "Virgin Media updates punishments for excessive data use," Business, Apr. 17, 2013.

* cited by examiner

*Primary Examiner* — Liton Miah (57) ABSTRACT

A method and system for managing voice codec rate used for voice communication by a user equipment device (UE). In accordance with the disclosure, the voice codec rate will be established (e.g., set or modified) based on a consideration of what type or types of non-voice communication the UE will engage in or is engaging in concurrently with the voice communication.

18 Claims, 5 Drawing Sheets

CONTROL OF VOICE COMMUNICATION CODEC MODE BASED ON NON-VOICE COMMUNICATION

BACKGROUND

Unless otherwise indicated herein, the description provided in this section is not itself prior art to the claims and is not admitted to be prior art by inclusion in this section.

A wireless communication system may include a number of base stations (e.g., cellular base stations, WiFi access points, or the like) that radiate to define wireless coverage areas, such as cells and cell sectors, in which user equipment devices (UEs) such as cell phones, tablet computers, tracking devices, embedded wireless modules, and other wirelessly equipped communication devices (whether or not controlled by a human user), can operate. In turn, each base station may be coupled with network infrastructure, including one or more gateways, routers, and switches, that provides connectivity with one or more transport networks, such as the public switched telephone network (PSTN) and/or a packet-switched network such as the Internet for instance. With this arrangement, a UE within coverage of a base station may engage in air interface communication with the base station and may thereby communicate via the base station with various remote network entities or with other UEs.

In a typical system, each base station's coverage area may operate on one or more carrier frequencies and may define various channels for carrying control and bearer communications between the base station and UEs in the base station's coverage. Further, the base station may work with UEs in its coverage to manage assignment and/or use of various air interface resources, such as particular channels or portions of channels, for carrying communications to and from the UEs. Using such air interface resources, a UE may engage in various types of communications with remote entities. These communications may include voice communications, such as circuit-switched voice calls or voice over Internet Protocol (VoIP) calls, as well as non-voice communications, such as video streaming, gaming, web browsing, email communication, file transfer, among others.

When a UE engages in voice communication with a remote entity, the UE and the remote entity may make use of an agreed voice codec to facilitate efficient transmission of voice in digital form. Considering a voice call between two users each operating a respective device, for example, each device may receive voice from a user, sample and digitize the voice to produce a representative digital bit stream, apply a voice codec to the bit stream to produce an encoded bit stream, and transmit the encoded bit stream to the other device. The other device may then receive the encoded bit stream, apply the voice codec to the decode the encoded bit stream so as to uncover the digital bit stream, and convert the digital bit stream to analog form for playout to user.

Voice codecs may be fixed rate or variable rate. A fixed rate voice codec represents voice by a fixed number of bits per unit time, such as for every 20 milliseconds of voice. A variable rate codec, on the other hand, may have a range of encoding rates for representing voice with a varying number of bits per unit time. Examples of variable rate voice codecs include, without limitation, Adaptive-Multi-Rate Narrowband (AMR-NB), Adaptive-Multi-Rate Wideband (AMR-WB), and Enhanced Voice Services (EVS). When using a variable rate codec, a device engaged in a voice communication may determine that the voice codec rate should be changed to a particular rate and may inform the other device, and the communication may proceed using the new codec rate.

In a wireless communication system, the voice codec rate used by a UE could be set dynamically based on the strength or quality of the UE's air interface communication with a base station. For instance, if the UE is in weak coverage of the base station, the UE could use a lower voice codec rate to help increase the chances of successful communication over the weak air interface. Whereas, if the UE is in strong coverage of the base station, the UE could use a higher voice codec rate to help improve quality of the voice communication.

OVERVIEW

Disclosed herein is an improved method and system for managing voice codec rate used for voice communication by a UE. In accordance with the disclosure, a UE's voice codec rate will be established (e.g., set or modified) specifically based on a consideration of what type or types of non-voice communication the UE engages in (e.g., will engage in or is engaging in) concurrently with the voice communication. In particular, the voice codec rate could be selected based on the throughput-intensity of the concurrent non-voice communication. For example, if the UE engages in relatively high throughput non-voice communication, such as video streaming or gaming communication, then the UE could be made to use a relatively low voice codec rate. Whereas, if the UE engages in relatively low throughput non-voice communication (e.g., e-mail exchange or web browsing) concurrently with the voice call, then the UE could be made to use a relatively high rate voice codec.

The point here is to consider the type(s) of the UE's non-voice communication and to actively select and cause the UE to use a particular voice codec rate (e.g., a voice codec mode defining a particular rate) based at least in part on the determined type(s) of non-voice communication. For instance, an entity carrying out this process could apply a mapping table (correlation data) or similar logic that correlates various types of non-voice communication with respective voice codec rates. Thus, upon determining the type(s) of non-voice communication in which the UE engages (e.g., will engage in or is currently engaged in) concurrently with the voice communication, the entity could refer to the mapping table or apply similar logic to determine, based on the determined type(s) of non-voice communication, which voice codec rate to use. And the entity could then cause the UE to use the determined voice codec rate.

Further, the entity could also take into account one or more other factors in addition to the type(s) of non-voice communication as a basis to select a voice codec rate for the use by the UE. For instance, the entity could also consider the strength or quality of the UE's air interface connection, the overall load of the air interface, and/or one or more other factors. A mapping table may thus correlate type(s) of non-voice communication, in combination with such additional factors, with respective voice codec rates, and so an entity carrying out the process could refer to the mapping table or apply similar logic to determine, based on the determined type(s) of non-voice communication and further based on considerations such as air interface conditions, which voice codec rate to use. And the entity could then cause the UE to use the determined voice codec rate.

The disclosed method and system can help effectively manage simultaneous voice and data communication. In particular, the disclosure can help to address a situation where a UE engages in a voice communication session such as a voice call and, concurrent with the voice communication session, separately engages in one or more non-voice communications, such as video streaming, online gaming, file transfer, e-mail, or the like.

Accordingly, in one respect, disclosed is a method to control voice-codec mode (e.g., voice codec rate) used for voice communication by a UE. In accordance with the disclosure, the method involves determining a type of non-voice communication in which the UE engages (i.e., will engage in or is engaging in) concurrently with the voice communication. In turn, the method then involves, based at least in part on the determined type of non-voice communication in which the UE engages concurrently with the voice communication, (i) selecting a voice-codec mode, such as a voice-codec rate, to be used for the voice communication by the UE and (ii) causing the UE to use the selected voice-codec mode for the voice communication.

In another respect, disclosed is a base station configured to manage voice-codec rate used for voice communication by a UE served by the base station. The disclosed base station includes a wireless communication interface including an antenna structure and transceiver for communicating over an air interface with the UE, and a controller including a processing unit, non-transitory data storage, and program instructions stored in the data storage and executable by the processing unit to carry out various operations. In accordance with the disclosure, for instance, the controller may operate to (a) determine a type of non-voice communication in which the UE engages concurrently with the voice communication, and (b) based at least in part on the determined type of non-voice communication in which the UE engages concurrently with the voice communication, (i) select a voice-codec rate to be used for the voice communication by the UE and (ii) cause the UE to use the selected voice-codec rate for the voice communication.

Further, in yet another respect, disclosed is a method for controlling voice-codec rate used by a UE for a voice call. In accordance with the disclosure, the method involves (a) determining a type of non-voice-call communication in which the UE engages, (b) determining, based at least in part on the determined type of non-voice-call communication in which the UE engages, a voice-codec rate to be used by the UE for the voice call, and (c) causing the UE to use the determined voice-codec rate for the voice call.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Features of the present disclosure can be implemented generally in any scenario where a UE has an air interface connection with a base station (e.g., a cellular base station or a WiFi access point) and, through that air interface connection, the UE engages in voice communication and non-voice communication. By way of example, the UE may be served by a cellular wireless base station according to an air interface protocol such as Long Term Evolution (LTE), Code Division Multiple Access (CDMA), or Global System for Mobile Communication (GSM), the cellular base station may provide connectivity with one or more transport networks, and the UE may thereby engage in voice and non-voice communication with various entities via a cellular air interface connection, the cellular base station, and the transport network(s). And as another example, the UE may be served by a WiFi access point according to an IEEE 802.11 protocol, the access point may provide connectivity with one or more transport networks, and the UE may thereby engage in voice and non-voice communication with various entities via a WiFi air interface connection, the access point, and the transport network(s). Other examples are possible as well.

Figure 1:
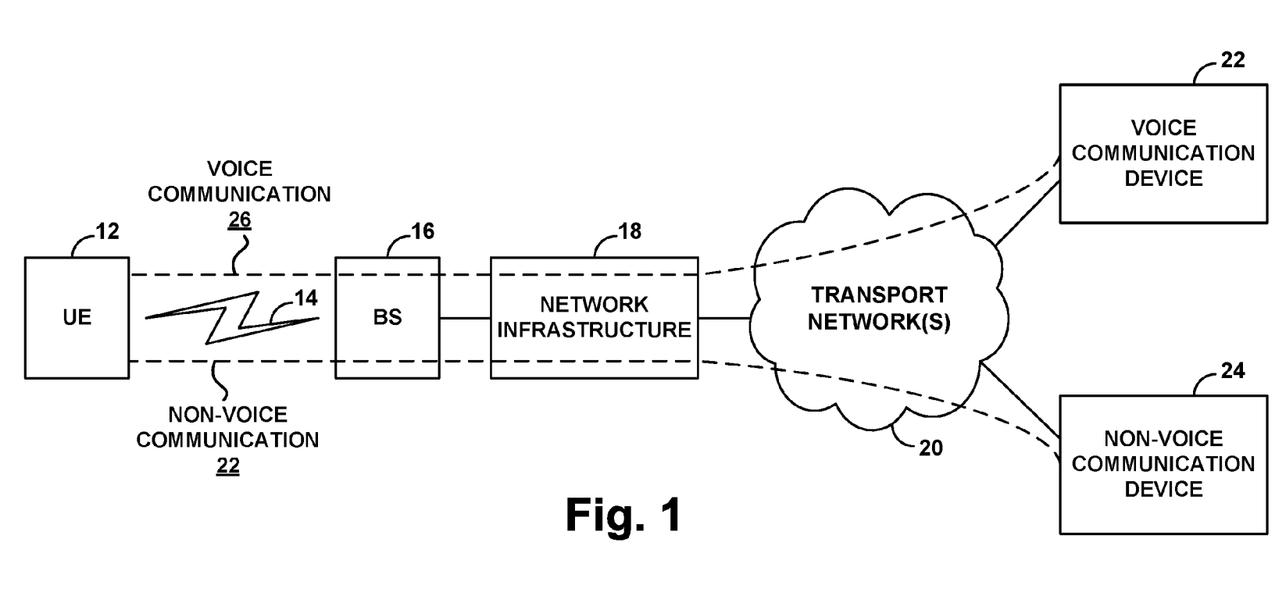
FIG. 1 is a simplified block diagram of a system in which aspects of the present disclosure can be implemented.

FIG. 1 is a simplified block diagram of an example of such communication system in which features of the present disclosure can be implemented. As shown in the example system, a representative UE 12 is in wireless communication over an air interface 14 with a base station 16, and the base station is in communication with network infrastructure 18 (e.g., one or more switches, gateway, or routers) that provides connectivity with one or more transport networks 20. Shown accessible via the transport network(s) are then multiple example communication devices, including a voice communication device 22 and a non-voice communication device 24.

With this arrangement, the UE 12 may engage in communication via air interface 14, base station 16, network infrastructure 18, and transport network(s) 20, with the various remote entities. For instance, the UE may engage in voice communication 26 with device 22 (e.g., an interactive voice call such as a telephone call between a user of the UE 12 and a user of device 22), and the UE may engage in non-voice communication 28 (e.g., video streaming, music or other audio streaming, web browsing, e-mail communication, or other non-voice call communication) with device 24.

It should be understood, of course, that numerous variations from this and other arrangements and operations described herein are possible. For example, voice communication device 22 and non-voice communication device 24 could be integrated together and/or additional remote communication devices could be provided. Further, the communication path over which the UE may engage in voice and non-voice communications with one or more other entities could take forms other than that shown. For instance, the communication path between the base station 16 and the remote entities may exclude greater or fewer components. More generally, features can be added, removed, combined, distributed, or otherwise modified.

As noted above, the present disclosure provides for controlling the voice codec (e.g., voice codec rate) for a UE's voice communication, based on a consideration of the type(s) of non-voice communication in which engages (e.g., will engage or is currently engaging) concurrently with the voice communication. In the arrangement of FIG. 1, for instance, we can assume that the UE engages in non-voice communication 28 concurrent with voice communication 26. Thus, at issue could be what particular type of communication the non-voice communication 28 is, such as what type of non-voice content the UE is communicating. Based at least in part on that type of non-voice communication, a voice codec could be selected, and the UE could be made to use the selected voice codec in voice communication 26.

As further noted above, this process could be carried out by various entities. For example, the process could be carried out by the UE itself, in which case the UE could decide which voice codec to use and could engage in voice communication with device 22 using that voice codec. As another example, the process could be carried out by base station 16, in which case the base station could decide which voice codec the UE should use and could then signal to the UE and/or to device 22 to cause the UE and device 22 to use that voice codec in their voice communication with each other. Other examples are possible as well.

In practice, the entity carrying out this process could determine the type of non-voice communication in which the UE is engaged before and possibly leading up to the start of the UE's voice communication, or that the UE typically engages in that type of non-voice communication when the UE is engaged in a voice communication. This type of analysis may support a conclusion that the UE will likely engage in the determined type of non-voice communication concurrently with the UE's voice communication. And so the entity could use this determined type of non-voice communication as a basis to select a voice codec at the start of the voice communication and could cause the UE to use the determined type of voice codec accordingly.

Alternatively or additionally, the entity carrying out this process could determine the type of non-voice communication in which the UE actually engages during the UE's voice communication. And the entity could then use the determined type of non-voice communication as a basis to select a voice codec during the voice communication and could cause the UE to use the determined type of voice codec accordingly, possibly causing the UE to switch from using another voice codec to using the determined voice codec.

An entity could determine in various ways the type of communication in which a UE engages. By way of example, the entity could consider the type of bearers, flows, or the like over which the UE engages in certain communication and determine the communication type on that basis. As another example, the entity could engage in deep packet inspection or the like, to read data such as communication setup messaging or communication content itself flowing to or from the UE, as a basis to determine the type of communication. In this way, the entity might determine that the UE is engaged in a voice communication, such as a voice call, and the entity might further determine that the UE is engaged or will engage in a particular type of non-voice communication concurrently with the voice communication.

As indicated above, the entity carrying out this process could apply a mapping table or similar logic to correlate types of non-voice communication with voice codec modes, such as with voice codec rate. Table 1 is an example of such a table, mapping particular types of non-voice communication to particular AMR-WB codecs.

TABLE 1

| Non-Voice Communication Type (E.g., Non-Voice Content Type) | Voice Codec Mode (E.g., Voice Codec Rate) |
| --- | --- |
| High Definition Video Streaming | AMR-WB 8.85 |
| Standard Definition Video Streaming | AMR-WB 12.65 |
| Audio Streaming | AMR-WB 18.25 |
| Web browsing | AMR-WB 23.85 |
| E-Mail communication | AMR-WB 23.85 |

Without limitation, this example table maps relatively high throughput (high data intensity) types of non-voice communication to relatively low-rate versions of the AMR-WB codec, and maps relatively low throughput (low data intensity) types of non-voice communication to relatively high-rate versions of the AMR-WB codec. In particular, the table maps high definition video streaming to the relatively low bit-rate AMR-WB 8.85 voice codec (which represents each 20 millisecond voice frame by 177 bits), the table maps standard definition video streaming to the somewhat higher bit-rate AMR-WB 12.65 voice codec (which represents each 20 millisecond voice frame by 253 bits), the table maps audio streaming to the still higher bit-rate AMR-WB 18.25 voice codec (which represents each 20 millisecond voice frame by 265 bits), and the table maps web browsing and e-mail communication to the even higher bit-rate AMR-WB 23.85 voice codec (which represents each 20 millisecond voice frame by 477 bits).

Many variations from this example table or corresponding logic are possible as well. For instance, the table could map various types of non-voice communication to different voice codec modes, such as different types of voice codecs, not limited to AMR-WB codecs. Further, the table might define a different correlation between type of non-voice communication and voice codec, perhaps other than having a lower-rate voice codec for higher-intensity non-voice communication and vice versa. Other examples are possible as well.

Figure 2:
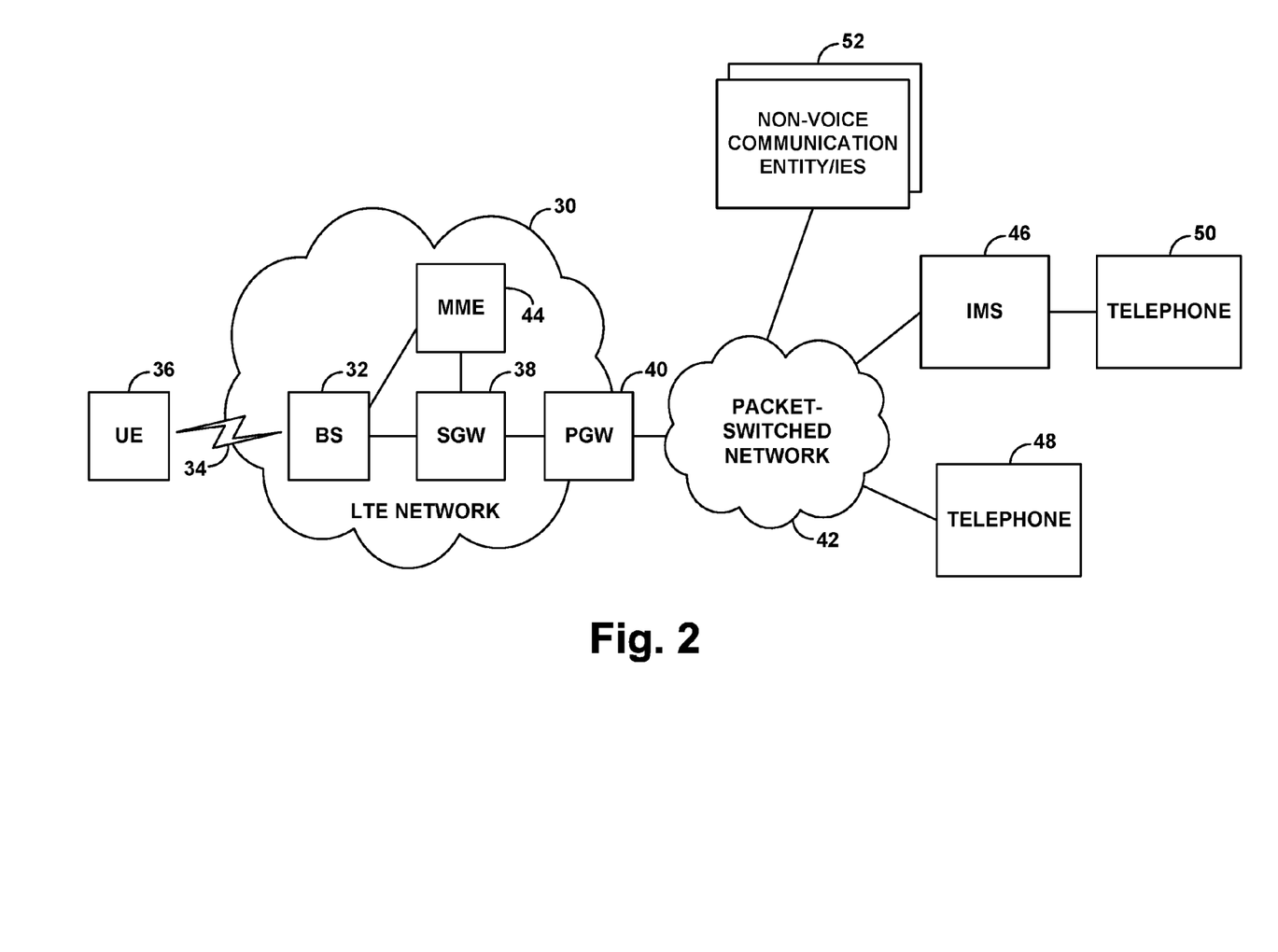
FIG. 2 is another simplified block diagram of a system in which aspects of the present disclosure can be implemented.

FIG. 2 is next a more specific but still simplified block diagram of an example communication system in which features of the disclosure can be implemented. In particular, FIG. 2 depicts a representative arrangement in which a UE has LTE cellular connectivity and can thereby engage in voice and non-voice communication via an LTE air interface.

At the core of FIG. 2 is an LTE access network 30, which includes an LTE base station (evolved Node-B (eNodeB)) 32 configured to provide cellular coverage defining an air interface 34 on one or more LTE carrier frequencies, and the base station is shown serving an example UE 36 over the air interface. In addition, the base station has a communication interface with a serving gateway (SGW) 38, which in turn has a communication interface with a packet data network gateway (PGW) 40 that provides connectivity with a packet-switched network 42. And the base station also has a communication interface with a mobility management entity (MME) 44, which also has a communication interface with the SGW.

With this arrangement, the UE may have a radio link layer connection (e.g., Radio Resource Control (RRC) connection) over air interface 34 with base station 32, and the UE may have an assigned Internet Protocol (IP) address for communicating on network 42. Further, the UE may have various established bearers (bearer tunnels) that extend between the UE and the PGW, through which the UE can engage in various packet-data communication on network 42. In practice, each bearer may have a particular quality of service class identifier (QCI), which may indicate a class of content to be carried on the bearer and a quality of service (QoS) level, such as best-efforts or guaranteed-bit-rate, to be provided for communication on the bearer. And entities such as the eNodeB, SGW, and PGW may maintain for the UE a context record indicating which such bearers the UE has, so as to facilitate proper handling of data communication depending on which bearers are in use. By way of example, the UE may have a default low-QoS bearer (e.g., QCI 9 bearer) for general packet-data communication, such as e-mail communication, web browsing, and the like) on network 42. And the UE may have a default mid-QoS bearer (e.g., QCI 5 bearer) for engaging in signaling to set up voice calls.

Shown sitting on network 42 are then some representative voice communication entities, including an Internet Multimedia Subsystem (IMS) platform 46 and an end-user telephone 48, with which UE 36 might engage in voice communication such as voice over Internet Protocol (VoIP) call communication for instance.

IMS platform 46 functions as a voice call server to facilitate VoIP communication with UEs served by one or more access networks, such as LTE network 30 for instance, providing connectivity with one or more other networks through which to connect and control voice calls with remote call parties such as a remote telephone 50.

In practice, to facilitate voice call communication between UE 36 and remote telephone 50 via IMS 46, the UE may engage in voice call setup signaling, such as Session Initiation Protocol (SIP) signaling, with IMS 46, to set up a voice call leg such as a Real-time Transport Protocol (RTP) session, between the UE and the IMS. In doing so, the UE and IMS may use Session Description Protocol (SDP) fields of the SIP signaling to negotiate and agree with each other on use of a particular voice codec for the call. Further, the IMS may engage in signaling with the LTE network 30, to cause the LTE network to establish for the UE a VoLTE bearer, such as a high-QoS bearer (e.g., QCI 1 bearer) with guaranteed bit rate for carrying the voice call traffic of the call, and the base station and gateways may update their UE context records accordingly. Meanwhile, the IMS may also engage in signaling to set up a voice call leg between the IMS and the remote telephone 50, and the IMS may then bridge those call legs together to enable a user of the UE to talk with a user of the remote telephone.

In this example arrangement, the UE may be considered to be in voice communication with the IMS (even though the IMS is not itself a user operated device), with the UE and IMS being in SIP communication with each other to control the voice communication such as to control which voice codec is used for the communication.

Likewise, UE 36 might establish and engage in more direct VoIP call communication with end-user telephone 48 on network 42. For example, UE 36 and telephone 48 may more directly engage in SIP signaling or the like with each other to establish an RTP session with each other and to negotiate and agree on use of a particular voice codec for the call. Further, the UE may work with the LTE network 30 to establish a high-QoS bearer (e.g., QCI 1 bearer) with guaranteed bit rate for carrying voice call traffic of this call as well. In this example arrangement, the UE may thus be considered to be in voice communication with the telephone 48, with the UE and telephone being in SIP communication with each other to control the voice communication such as to control which voice codec is used for the communication.

Further shown sitting on network 42 by way of example are various example entities 52 with which UE 36 might engage in non-voice communication of types such as those noted above for instance. By way of example, such entities might include streaming video servers, streaming audio servers, gaming servers, web servers, e-mail servers, or other systems or devices that can engage in non-voice communication (e.g., non-voice-call communication). Each such entity might be located at a particular address on network 42 and may use particular ports for particular types of communication.

The UE could establish and engage in non-voice communication with these entities in various ways. For example, the UE could engage in IP-based signaling, such as SIP signaling, RTP Control Protocol (RTCP) signaling, Real Time Streaming Protocol (RTSP) signaling, Hypertext Transfer Protocol (HTTP) signaling, Simple Mail Transfer Protocol (SMTP) signaling, or the like, to set up or engage in such non-voice communication. As a specific example, the UE could engage in HTTP and RTSP signaling with a video streaming server to establish and control a video streaming media session and could then receive and play out a real-time video stream from the server. As another example, the UE could engage in HTTP signaling with a web server to request and receive web content, which the UE could then render. And still another example, the UE could engage in SMTP signaling with an e-mail server to send or receive e-mail messages. Other examples are possible as well.

In the arrangement of FIG. 2, the disclosed process could be carried out generally by any entity that could determine the type of non-voice communication in which UE 36 engages (e.g., is engaged in or will engage in) concurrently with voice communication and could cause the UE to use a particular voice codec mode (e.g., particular voice codec or voice codec rate) selected based at least in part on the determined type(s) of non-voice communication. By way of example, the process could be carried out by the UE or by base station 32. For illustration, the following remaining discussion will focus on example implementation by base station 32.

For purposes of this process, base station 16 could determine in various ways the type of communication in which UE 36 is engaged, such as to detect voice communication by the UE and to detect and determine a type of non-voice communication in which the UE engages concurrently with the voice communication. To facilitate this, as noted above, the base station could engage in deep packet inspection to determine communication type from the content of packet data transmitted to or from the UE, while taking precautions to ensure protection of UE user privacy.

For instance, the base station could read content of such packet data to determine that the packet data contains particular signaling (e.g., SIP, HTTP, RTSP, or the like) with particular network addresses and perhaps particular ports, and the base station could map such signaling and/or network addresses/ports to particular type of communication. By way of example, the base station could detect SIP signaling with the IMS to set up a VoIP call, as an indication that the UE is going to engage in a voice call communication. And the base station could detect RTSP signaling with a streaming video server as an indication that the UE is going to engage in video streaming communication. Further, as bearer content such as encoded voice, streaming video, or other content is transmitted to or from the UE, the base station might detect the presence of such content and/or consider the addresses or ports to or from which the packet data is being communicated as an indication of the type of communication. The base station could consider packet headers and/or payload sections as a basis for this analysis.

In addition or alternatively, the base station could determine the type of communication in which the UE is engaged based on consideration of the type of bearers or flows carrying the communication to or from the UE, as denoted by QCI level or other corresponding indicia (e.g., Differential Services Point Code (DSCP) packet headers or the like). For instance, the base station might determine that the UE has a QCI 1 bearer as an indication that the UE is engaged in or will be engaged in a voice call, or the base station might determine that the UE has a QCI 3 bearer as an indication that the UE is engaged in or will be engaged in gaming communication.

Through this or other analysis, the base station may detect actual or likely concurrency of voice and non-voice communication by the UE. For example, the base station could detect that the UE has been engaged in ongoing or regularly occurring non-voice communication at the time the base station detects that the UE is setting up a voice call. As another example, the base station could detect that the UE is engaged in a voice call and that the UE begins to concurrently engage in a non-voice communication. As another example, the base station could otherwise detect during the course of a voice call that the UE is engaging in or begins to engage in non-voice communication or changes the type of non-voice communication in which the UE is engaged concurrently with the voice call. Other examples are possible as well.

The base station may then refer to a mapping table such as that discussed above, or apply other such logic, to determine based on the type or types of non-voice communication in which the UE engages concurrently with the voice communication as a basis to determine a voice codec mode that the UE should use for the voice communication and could cause the UE to use the determined voice codec mode. This could occur at the time of voice call setup, in which case the base station could cause the voice call to start with use of the determined voice codec mode. Alternatively or additionally, this could occur during the course of the voice call, in which case the base station could cause the voice call to switch from use of another voice codec mode to use of the determined voice codec.

Note also that, in addition to basing the selection of voice codec mode on the determined type(s) of non-voice communication in which the UE engages concurrently with the voice communication, the base station could base that selection on one or more other factors (i.e., as additional factors). For example, the base station could additionally base the selection of the voice-codec mode on an evaluation of the air interface, such as on the UE's reported signal strength from the base station and/or on overall load of the air interface. For instance, the base station could apply a mapping table such as that noted above but enhanced to correlate particular voice codec modes to particular combinations of (i) type(s) of non-voice communication in which the UE engages concurrently with the voice communication and (ii) air interface condition(s). As another example, the base station could additionally base the selection of voice-codec mode on a consideration of the quantity of non-voice communication in which the UE engages, such as the throughput or other rate of such non-voice communication per unit time on a statistical basis for instance, possibly selecting a lower voice codec rate in response to the UE engaging in a greater extent of such non-voice communication or selecting a higher voice codec rate in response to the UE engaging in a lesser extent of such non-voice communication. Other examples of additional factors are possible as well.

As noted above, the base station could cause the UE to use the determined voice codec mode in various ways. By way of example, the base station could transmit a control signal to the UE, such as an RRC control message, that specifies the determined voice codec mode and directs the UE to use that voice codec mode. The UE could then responsively use the indicated voice codec mode, such as by specifying the voice codec mode in a signal (e.g., SIP message, RTP header, or the like) to the other end of the voice communication and then encoding and decoding the voice communication accordingly. And as another example, the base station could transmit a control signal to the other end of the voice call (or to another such remote entity in which the UE engages in the voice communication), such as to the IMS in a VoLTE scenario, to cause the other end of the voice call to begin using the determined voice codec in a similar manner, which would thus result in the other end similarly informing the UE and the UE thus applying the determined voice codec as well. Other examples are possible as well.

Figure 3:
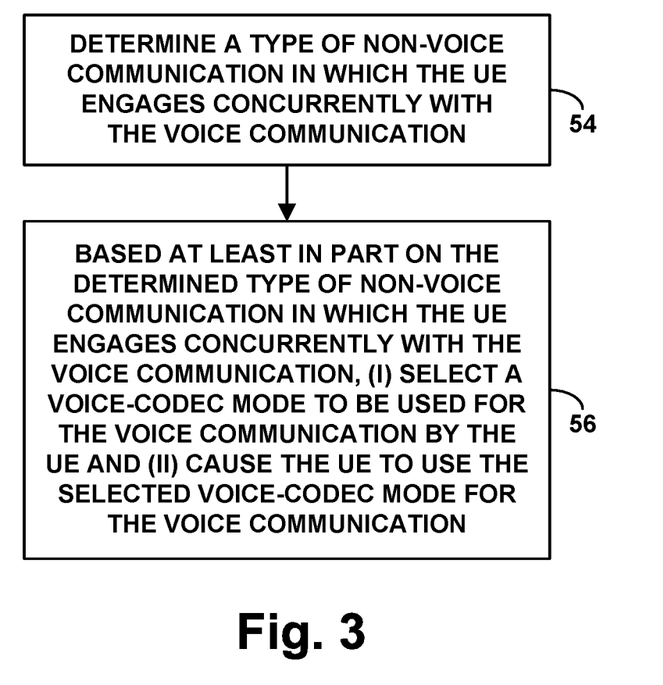
FIG. 3 is a flow chart depicting operations that can be carried out in accordance with the disclosure.

FIG. 3 is next a flow chart generally depicting an example method in line with the discussion above, to control voice-codec mode used for voice communication by a UE. As shown in FIG. 3, at block 54, the method involves determining a type of non-voice communication in which the UE engages concurrently with the voice communication. And at block 56, the method involves, based at least in part on the determined type of non-voice communication in which the UE engages concurrently with the voice communication, (i) selecting a voice-codec mode to be used for the voice communication by the UE and (ii) causing the UE to use the selected voice-codec mode for the voice communication.

Figure 4:
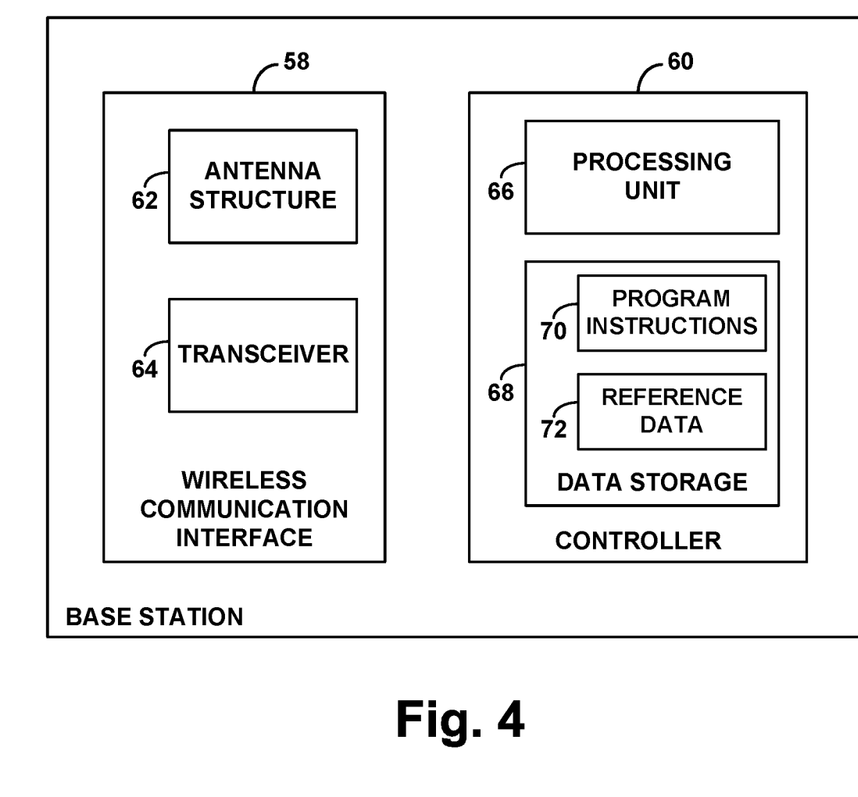
FIG. 4 is a simplified block diagram of a base station operable in accordance with the disclosure.

FIG. 4 is next a simplified block diagram of an example base station operable to carry out various features described above. This base station could generally take any of a variety of forms, including, for instance, a macro base station, a small cell base station, a relay base station, a femto base station, or the like. As shown, the example base station includes a wireless communication interface 58 and a controller 60.

The wireless communication interface 58 may include an antenna structure 62 and wireless transceiver 64 and is operable to provide a wireless coverage area defining an air interface over which to communicate with a UE. Controller 56 may then comprise a processing unit (e.g., one or more microprocessors or other types of processors) 66, data storage (e.g., one or more volatile and/or non-volatile non-transitory storage components, such as optical, magnetic, or flash storage) 68, reference data 70 (e.g. a mapping table such as that noted above) stored in the data storage, and program instructions 72 stored in the data storage and executable by the processing unit to carry out operations such as those discussed herein.

Figure 5:
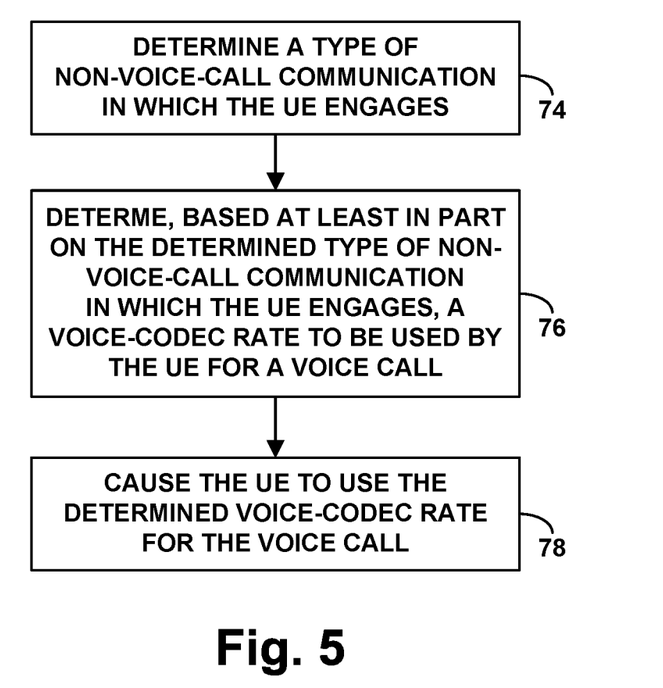
FIG. 5 is another flow chart depicting operations that can be carried out in accordance with the disclosure.

Finally, FIG. 5 is another flow chart depicting an example method for controlling voice-codec rate used by a UE for a voice call. As shown in FIG. 5, at block 74, the method involves determining a type of non-voice-call communication in which the UE engages. At block 76, the method then involves determining, based at least in part on the determined type of non-voice-call communication in which the UE engages, a voice-codec rate to be used by the UE for the voice call. And at block 78, the method involves causing the UE to use the determined voice-codec rate for the voice call.

Exemplary embodiments have been described above. Those skilled in the art will understand, however, that changes and modifications may be made to these embodiments without departing from the true scope and spirit of the invention.

We claim:

1. A method to control voice-codec mode used for a voice call in which a user equipment device (UE) engages, the method comprising:
   determining a type of non-voice communication in which the UE engages separately from and concurrently with the voice call; and
   based at least in part on the determined type of non-voice communication in which the UE engages separately from and concurrently with the voice call, (i) selecting a voice-codec mode to be used for the voice call and (ii) causing the UE to use the selected voice-codec mode for the voice call.

2. The method of claim 1, wherein the UE is served by a base station over an air interface between the base station and the UE, and wherein the selecting and causing are carried out by the base station.

3. The method of claim 2, wherein selecting the voice-codec mode is additionally based on evaluation of the air interface.

4. The method of claim 3, wherein selecting the voice codec mode additionally based on evaluation of the air interface comprises selecting the voice codec mode based at least in part on signal strength of the air interface.

5. The method of claim 2, wherein causing the UE to use the selected voice-codec mode for the voice call comprises transmitting to the UE a control message directing the UE to use the selected voice-codec mode.

6. The method of claim 1, wherein the voice call is between the UE and a remote entity, and where causing the UE to use the selected voice-codec mode for the voice call comprises signaling to cause the remote entity to use the selected voice-codec mode for the voice call,
   whereby the remote entity using the selected voice-codec mode for the voice call between the UE and the remote entity results in the UE using the selected voice-codec mode for the voice call.

7. The method of claim 1, wherein the voice call uses a variable rate codec, and wherein selecting the voice-codec mode to be used for the voice call comprises selecting a codec rate for the variable rate codec.

8. The method of claim 7, wherein the variable rate codec is an Adaptive Multi Rate (AMR) audio codec comprising one or both of narrow-band modes and wide-band modes.

9. The method of claim 1, wherein determining the type of non-voice communication in which the UE engages concurrently with the voice call comprises determining the type based at least in part on deep packet inspection of data flowing to or from the UE.

10. The method of claim 1, further comprising determining a quantity of the non-voice communication in which the UE engages separately from and concurrently with the voice call, wherein selecting the voice-codec mode is further based on the determined quantity.

11. The method of claim 1, wherein selecting the voice-codec mode based at least in part on the determined type of non-voice communication in which the UE engages separately from and concurrently with the voice call comprises selecting the voice-codec mode by reference to correlation data that maps various types of non-voice communication respectively with voice-codec modes.

12. A base station configured to manage voice-codec rate used for a voice call by a user equipment device (UE) served by the base station, wherein the base station comprises:
   a wireless communication interface including an antenna structure and transceiver for communicating over an air interface with the UE; and
   a controller including a processing unit, non-transitory data storage, and program instructions stored in the data storage and executable by the processing unit to (a) determine a type of non-voice communication in which the UE engages separately from and concurrently with the voice call, and (b) based at least in part on the determined type of non-voice communication in which the UE engages separately from and concurrently with the voice call, (i) select a voice-codec rate to be used for the voice call by the UE and (ii) cause the UE to use the selected voice-codec rate for the voice call.

13. The base station of claim 12, wherein the selecting of the voice codec rate is additionally based on an evaluation of the air interface.

14. The base station of claim 12, wherein causing the UE to use the selected voice-codec rate for the voice communication comprises transmitting to the UE a control message that directs the UE to use the selected voice-codec rate.

15. A method for controlling voice-codec rate used by a user equipment device (UE) for a voice call, the method comprising:
   determining a type of non-voice-call communication in which the UE engages separately from the voice call;
   determining, based at least in part on the determined type of non-voice-call communication in which the UE engages separately from the voice call, a voice-codec rate to be used by the UE for the voice call; and
   causing the UE to use the determined voice-codec rate for the voice call.

16. The method of claim 15, wherein determining the type of non-voice-call communication in which the UE engages separately from the voice call comprises determining the type of non-voice-call communication in which the UE is engaged in or will engage in separately from and concurrently with the voice call.

17. The method of claim 15, wherein the method is carried out by an entity other than the UE, and wherein causing the UE to use the determined voice-codec rate for the voice call comprises transmitting to the UE a control message directing the UE to use the determined voice-codec rate.

18. The method of claim 15, wherein the voice call comprises voice communication between the UE and a remote entity, and where causing the UE to use the selected voice-codec rate for the voice call comprises signaling to cause the remote entity to use the selected voice-codec rate for the voice communication,
   whereby the remote entity using the selected voice-codec rate for the voice communication results in the UE using the selected voice-codec rate for the voice communication.

* * * * *